United States Patent [19]

Benisek et al.

[11] Patent Number: 4,707,467

[45] Date of Patent: Nov. 17, 1987

[54] GAS FILTER

[75] Inventors: Ladislav Benisek, Burley-in-Wharfedale; Gerald K. Edmondson, Bradford, both of England

[73] Assignee: Wool Development International Limited, Ilkley, England

[21] Appl. No.: 867,808

[22] Filed: May 27, 1986

[30] Foreign Application Priority Data

May 28, 1985 [GB] United Kingdom ................. 8513386

[51] Int. Cl.$^4$ ........................ B01J 20/24; B01J 20/06; B01J 31/32; F01N 3/15
[52] U.S. Cl. ........................................ 502/403; 55/68; 55/73; 55/74; 55/487; 422/177; 423/213.2; 423/219; 423/239; 423/244; 423/247; 502/150; 502/159

[58] Field of Search ............... 502/400, 401, 403, 404, 502/155, 159; 423/244; 55/73, 487; 422/177

[56] References Cited

U.S. PATENT DOCUMENTS 4,087,583 5/1978 Moore ................................. 427/301
4,207,291 6/1980 Byrd et al. .......................... 502/400

Primary Examiner—P. E. Konopka
Attorney, Agent, or Firm—Bert J. Lewen; Henry Sternberg

[57] ABSTRACT

A filter for noxious gases such as sulphur dioxide or nitrogen dioxide comprises a keratinous fibre substrate within which is deposited an effective amount of manganese dioxide. The fibres, preferably sheep's wool, may be in the form of a fibrous bat and the manganese dioxide is deposited from acidified permanganate solution. The filter is most effective when maintained in the wet state.

12 Claims, No Drawings

GAS FILTER

This invention relates to a filter for gases, in particular for gases such as sulphur dioxide, nitrogen dioxide, ozone, formaldehyde, hydrogen sulphide and volatile lead products from car exhausts.

Emission of sulphur dioxide into the atmosphere is believed to cause so-called 'acid rain' which is thought to lead to destruction of forests, lakes and other natural habitats. Accordingly there is considerable interest in ways of reducing such emissions.

The present invention seeks to provide a simple form of filter which can be used to remove certain noxious gases from a gaseous stream.

According to the present invention there is provided a filter for noxious gases which comprises a keratinous fibre substrate within which is deposited an effective amount of manganese dioxide.

The invention also comprises a method of making such a filter which comprises providing a keratinous fibre substrate and treating the substrate with acidified permanganate solution whereby to effect deposition of manganese dioxide on to the fibres.

It has been found that keratinous fibres, in particular sheep's wool, are particularly suitable for taking up manganese dioxide which again is easily applied thereto from acidified permanganate solution, for example potassium permanganate solution acidified with acetic acid. High levels of manganese dioxide can be deposited, e.g. up to 30% owf, and the product so formed has useful properties in removing noxious gases such as sulphur dioxide, nitrogen dioxide and ozone from a gaseous air stream, particularly in the presence of moisture. The wool reacts as a reducing agent with potassium permanganate to form manganese dioxide in the fibres. With non-keratinous fibres it is necessary to apply an oxidsable organic component to the substrate first, before treatment with with potassium permanganate. The use of keratinous fibres eliminates this step.

The keratinous fibres may be in any suitable form but it is preferred that they are in the form of a loose bat which may or may not be needle punched to consolidate it. The density of such a bat can be adjusted to the end use required. The keratinous fibres preferably comprise sheep's wool.

It has been found that keratinous fibres have some activity, especially when wet, in the absorption of gases such as sulphur dioxide without any treatment but that a deposition of manganese dioxide in accordance with the invention dramatically improves the uptake of such gases. With gases such as sulphur dioxide and nitrogen dioxide it is believed that they act as reducing agents causing the manganese IV ion to be reduced to the manganese II ion thereby forming manganese II salts. With ozone it is believed that manganese dioxide has a catalytic effect which converts it to oxygen.

The keratinous fibre of the invention is, after deposition of manganese dioxide, brown in colour and as it absorbs gases such as sulphur dioxide the colour whitens thus providing a visible check on the useful life. The manganese dioxide can be regenerated by placing the filter into fresh permanganate solution. This regeneration can be repeated several times.

The invention will be illustrated further by the following examples.

EXAMPLE 1

A prescoured loose wool stock, a New Zealand second shear with fibre diameter of approximately 35 microns, was treated with 8%, 12%, 20% and 30% owf $KMnO_4$. The treatment was carried out in a laboratory dyemaster using 2% acetic acid owf at 50% C until the solution went clear. The wool was rinsed once and oven dried. The wool was brown/black owing to the presence of manganese dioxide in the fibre. An untreated sample of wool was taken to act as a control sample. Samples of each of the treatments were exposed to sulphur dioxide in both the dry (conditioned) state and in the wet state. The results in terms of absorption of $SO_2$ by the wool is given in Table 1 below.

It can be seen that the absorption of sulphur dioxide by the $KMnO_4$ treated wool in the wet state was significantly higher than that of the untreated wool and in proportion to the dosage level of permanganate used.

Thus filters made from fibres treated in accordance with the present invention can be used, especially in the wet state, for example with water present to a pick up of approximately 50%, as absorbers for sulphur dioxide. Tests indicated that the filter would be equally successful with nitrogen dioxide, ozone, formaldehyde, hydrogen sulphide, and volatile lead products from car exhausts.

EXAMPLE 2

Filters sometimes have to have flame resistant properties, which are also achieved by the product of the invention. Table 2 below shows that the permanganate treatment, at 10% owf and above imparts flame resistance to FAR 25.853(b) on standard upholstery fabric.

In addition, the treatment gives good smoke emission performance. This is most useful and unexpected since most flame retardants tend to increase the amount of smoke produced under flaming conditions, and is an additional advantage of the invention.

TABLE ONE

| | ABSORPTION OF $SO_2$ BY WOOL % $SO_2$/g. Dry Wool w/w | |
|---|---|---|
| TREATMENTS | CONDITIONED | WET STATE |
| Untreated | 2.4–2.5 | 5.3 |
| $KMnO_4$* 8%, 12%, 20%, 30% | 3.8 | 6.7, 11.6, 15.2 17.4 |

*$KMnO_4$ Treatment is Reversible.

TABLE TWO

| FLAMMABILITY AND SMOKE EMISSION OF A PERMANGANATE TREATED UPHOLSTERY FABRIC | | |
|---|---|---|
| TREATMENT | FLAMMABILITY FAR 25.853(b) | SMOKE EMISSION NBS SMOKE DENSITY CHAMBER. $D_{sf}$ 4 min value FLAMING CONDITIONS |
| Untreated | Fail | Typically 89 |
| 5% $KMnO_4$ o.w.f. + 2% HAc o.w.f. | Fail | 73 |
| 10% $KMnO_4$ o.w.f. + 2% HAc o.w.f. | Pass | 52 |
| 15% $KMnO_4$ o.w.f. + 2% HAc o.w.f. | Pass | 74 |
| 20% $KMnO_4$ o.w.f. + 2% HAc o.w.f. | Pass | 48 |

We claim:

1. A filter for noxious gases which comprises a keratinous fiber substrate impregnated with an effective amount of manganese dioxide.

2. The filter of claim 1 wherein the substrate is impregnated with up to 30% based on weight of fiber, of the manganese dioxide.

3. The filter of claim 2 wherein the substrate is impregnated with from 5% to 20%, based on weight of fiber, of manganese dioxide.

4. The filter of claim 1, 2 or 3 wherein the fibers are in the form of a loose bat.

5. The filter of claim 4 wherein the bat is consolidated by needle punches.

6. The filter of claim 1 wherein the filter is maintained in a wet state during use.

7. The filter of claim 6 wherein the filter contains about 50%, based on weight of fabric, of water.

8. A filter for noxious gases which comprises a keratinous fiber substrate impregnated with from 5% to 20%, based on weight of fiber, of manganese dioxide and maintained in a wet state with about 50%, based on weight of fabric, of water.

9. A method of making a filter as claimed in claim 1 which comprises providing a keratinous fibre substrate and treating the substrate with an acidified permanganate solution whereby to effect impregnation of manganese dioxide into the fibres.

10. A method as claimed in claim 9 in which the permanganate is potassium permanganate.

11. A method as claimed in claim 9 or 10 in which acidification is carried out using acetic acid.

12. A filter assembly for gases such as sulphur dioxide, nitrogen dioxide, ozone, formaldehyde, hydrogen sulphide, and volatile lead products from car exhausts, which comprises a housing containing a bat of keratinous fibres into which is impregnated an effective amount of manganese dioxide, the fibres being maintained in a wet state during use.

* * * * *